(12) United States Patent
Ho

(10) Patent No.: US 11,353,157 B2
(45) Date of Patent: Jun. 7, 2022

(54) PIVOTAL SUPPORTING DEVICE FOR REMOTE FACILITY

(71) Applicant: Oxti Corporation, Taipei (TW)

(72) Inventor: Chih Feng Ho, Taipei (TW)

(73) Assignee: OXTI CORPORATION, Taipei (TW)

( * ) Notice: Subject to any disclaimer, the term of this patent is extended or adjusted under 35 U.S.C. 154(b) by 0 days.

(21) Appl. No.: 17/037,106

(22) Filed: Sep. 29, 2020

(65) Prior Publication Data

US 2022/0099242 A1 Mar. 31, 2022

(51) Int. Cl.
*F16M 11/10* (2006.01)
*F16M 11/20* (2006.01)

(52) U.S. Cl.
CPC ......... *F16M 11/10* (2013.01); *F16M 11/2021* (2013.01)

(58) Field of Classification Search
USPC ........ 248/919, 922, 923, 921, 123.11, 123.2, 248/162.1, 404, 406, 406.2, 280.11, 248/281.11, 292.11, 292.13
See application file for complete search history.

(56) References Cited

U.S. PATENT DOCUMENTS

| | | | |
|---|---|---|---|
| 6,012,693 A | 1/2000 | Voeller et al. | |
| 6,315,259 B1 | 11/2001 | Kolb | |
| 6,394,403 B1 | 5/2002 | Hung | |
| 6,478,275 B1 | 11/2002 | Huang | |
| 6,769,657 B1 | 8/2004 | Huang | |
| 6,822,857 B2 | 11/2004 | Jung et al. | |
| 6,863,252 B2 | 3/2005 | Bosson | |
| 7,413,152 B1 * | 8/2008 | Chen | F16M 11/10 16/233 |
| 7,789,363 B2 * | 9/2010 | Duan | F16M 11/24 248/284.1 |
| 7,967,273 B2 * | 6/2011 | Zhou | F16M 11/2092 248/372.1 |
| 8,070,115 B2 * | 12/2011 | Wang | F16M 11/2021 248/920 |
| 8,201,792 B2 * | 6/2012 | Yuan | F16M 11/2092 248/299.1 |
| 8,672,277 B2 * | 3/2014 | Hsu | F16M 11/10 248/121 |
| 8,967,569 B2 * | 3/2015 | Hsu | F16M 11/10 248/284.1 |
| 2015/0077915 A1 * | 3/2015 | Saito | G06F 1/1601 361/679.22 |

* cited by examiner

*Primary Examiner* — Alfred J Wujciak
(74) *Attorney, Agent, or Firm* — Browdy and Neimark, PLLC

(57) ABSTRACT

A pivotal supporting device includes a supporting base, a pivot shaft disposed on the supporting base, a supporting arm having a plate attached to the pivot shaft, two levers having one end portions pivotally attached to the plate with pivot pins, a panel pivotally attached to the other end portions of the levers with pivot axles for forming a parallelepiped structure with the levers and the plate, and a spindle attached to the panel, a carrier attached to the spindle, and a remote member attached to the carrier. One or more spring biasing elements are engaged onto the pivot shaft and one or more spring biasing members are engaged onto the spindle and one or more spring biasing components are engaged between the pivot shaft and the spindle.

4 Claims, 6 Drawing Sheets

PIVOTAL SUPPORTING DEVICE FOR REMOTE FACILITY

BACKGROUND OF THE INVENTION

1. Field of the Invention

The present invention relates to a pivotal supporting device for a remote facility or member, such as a monitor, displayer, portable phone, television, keyboard, or the like, and more particularly to a pivotal supporting device including a pivotal supporting lever or arm for easily and solidly and stably supporting the remote or mobile facility or member in place.

2. Description of the Prior Art

Various kinds of typical supporting devices or apparatuses have been developed and provided for supporting a remote or mobile facility or member, such as a monitor, displayer, portable phone, mobile phone, television, keyboard, or the like.

For example, U.S. Pat. No. 6,012,693 to Voeller et al., U.S. Pat. No. 6,315,259 B1 to Kolb, U.S. Pat. No. 6,394,403 B1 to Hung, U.S. Pat. No. 6,478,275 B1 to Huang, U.S. Pat. No. 6,769,657 B1 to Huang, U.S. Pat. No. 6,822,857 B2 to Jung et al., U.S. Pat. No. 6,863,252 B2 to Bosson, and U.S. Pat. No. 7,413,152 B1 to Chen disclose several of the typical supporting devices or apparatuses for supporting a remote member. The typical supporting devices normally comprise a supporting lever or arm for engaging with and for supporting a remote or mobile facility or member.

However, the supporting lever or arm normally includes one or more parts or elements or covers that are required to be attached or mounted or secured to the supporting lever or arm with a number of screws or bolts or fastener members, and it is time consuming to drill and form the screw holes or the like in the supporting lever or arm and/or in the cover, and it is time consuming to screw or fasten the parts or elements or covers to the supporting lever or arm. In addition, the remote or mobile facilities or members may not be solidly and stably supported in place with the typical supporting devices or apparatuses.

The present invention has arisen to mitigate and/or obviate the afore-described disadvantages of the conventional pivotal supporting devices.

SUMMARY OF THE INVENTION

The primary objective of the present invention is to provide a pivotal supporting device including a supporting lever or arm for solidly and stably supporting a remote or mobile facility or member in place.

In accordance with one aspect of the invention, there is provided a pivotal supporting device comprising a supporting base, a pivot shaft disposed on the supporting base, a supporting arm including a plate attached to the pivot shaft, two levers having first end portions pivotally attached to the plate with pivot pins, the levers each including a second end portion, a panel pivotally attached to the second end portions of the levers with pivot axles for forming a parallelepiped structure with the levers and the plate, and a spindle attached to the panel, a carrier attached to the spindle, and a remote member attached to the carrier.

The pivot shaft includes a non-circular cross section segment engaged with the plate for preventing the plates from being rotated relative to the pivot shaft. The spindle includes a non-circular cross section segment engaged with the panel for preventing the panel from being rotated relative to the spindle. The supporting arm includes a housing engaged onto the levers and the plate and the panel and the pivot shaft and the spindle.

The supporting arm includes at least one spring biasing element engaged onto the pivot shaft and engaged with the supporting arm. The supporting arm includes at least one spring biasing member engaged onto the spindle and engaged with the supporting arm. The supporting arm includes at least one spring biasing component engaged between the pivot shaft and the spindle.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
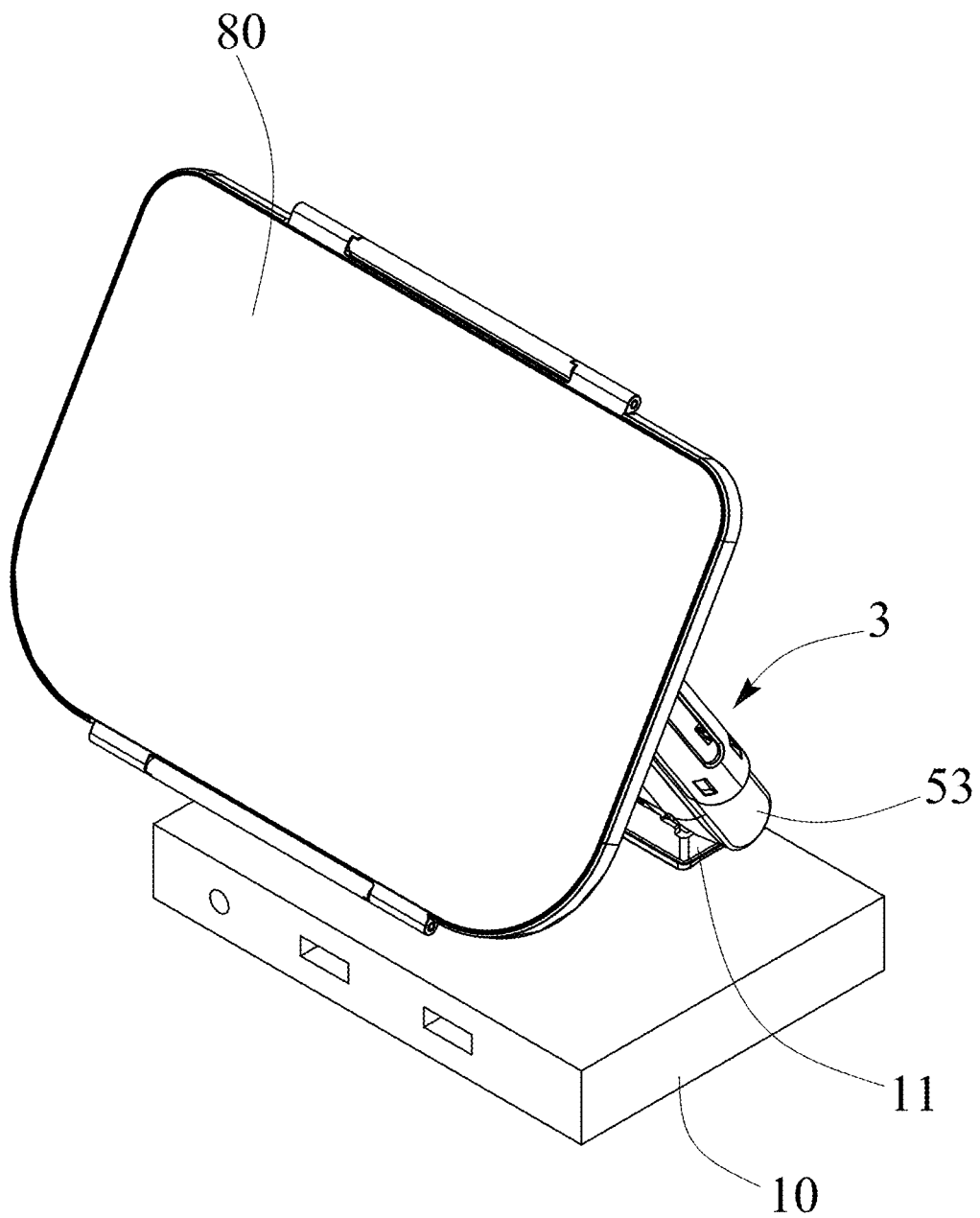
FIG. 1 is a perspective view illustrating the operation of a pivotal supporting device in accordance with the present invention.

Referring to the drawings, and initially to FIGS. 1-4, a pivotal supporting device in accordance with the present invention comprises a supporting stand or a supporting base 10 including a supporting seat 11 formed or provided on the supporting base 10, a pivot axle or shaft 12 is provided or disposed or attached or mounted or secured to the supporting seat 11 of the supporting base 10, and a supporting lever or arm 3 is pivotally or rotatably attached or mounted or secured to the supporting seat 11 with the pivot shaft 12. For example, as shown in FIGS. 6 and 7, the supporting arm 3 includes one or more panels or plates 30 attached or mounted or secured onto the pivot shaft 12 and engaged with the pivot shaft 12 with a non-circular cross section segment 13, or the pivot shaft 12 includes a non-circular cross section segment 13 engaged with the plate(s) 30 for preventing the plates 30 from being pivoted or rotated relative to the pivot shaft 12.

Figure 6:
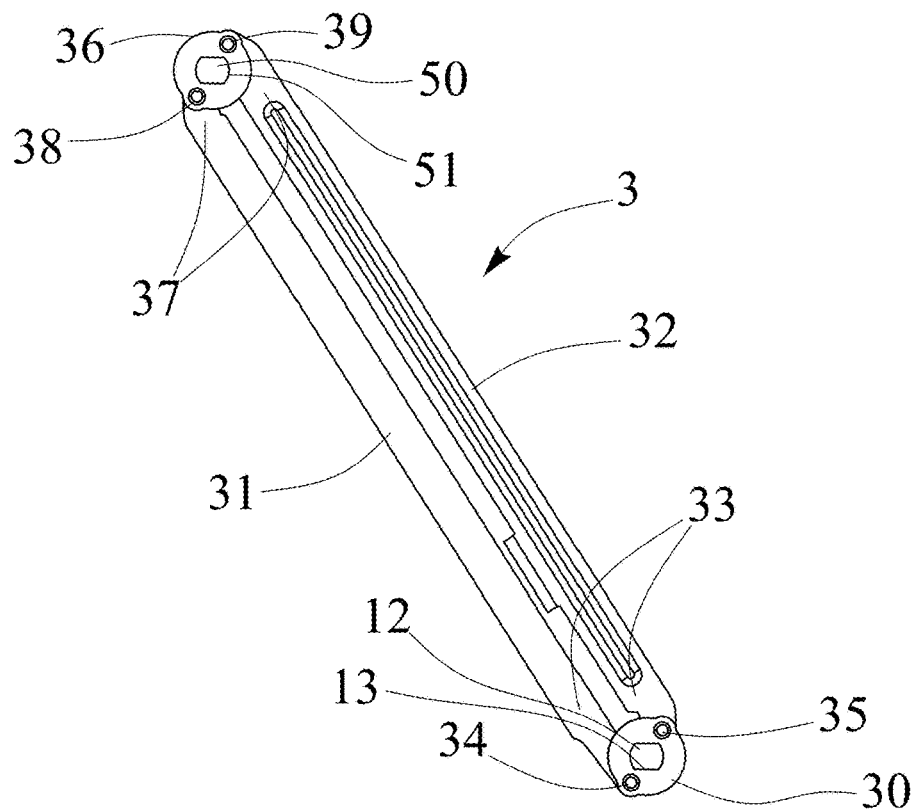
FIG. 6 is a side plan schematic view of the pivotal supporting lever or arm of the pivotal supporting device.
Figure 7:
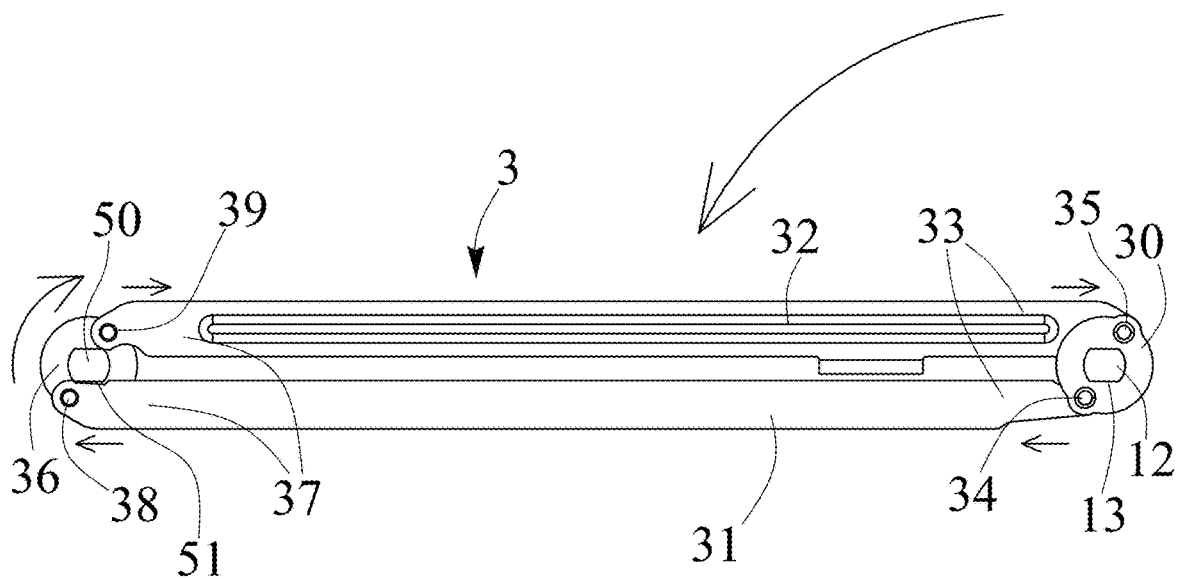
FIG. 7 is another side plan schematic view similar to FIG. 6, illustrating the operation of the pivotal supporting device.

The supporting arm 3 further includes one or more (such as two or a pair of) levers 31, 32 (FIGS. 4-7) having one or lower or first end portion 33 pivotally or rotatably attached or mounted or secured to the plate 30 with pivot pins 34, 35 for allowing the levers 31, 32 to be pivoted or rotated relative to the plate 30 and the supporting seat 11 and the supporting base 10, best shown in FIGS. 6 and 7. The supporting arm 3 further includes one or more plates or panels 36 pivotally or rotatably attached or mounted or secured to the other or upper or second end portion 37 of the levers 31, 32 with pivot axles 38, 39 for allowing the levers 31, 32 to be pivoted or rotated relative to the panel 36 and for allowing the panel 36 to be pivoted or rotated relative to the plate 30 and the supporting seat 11 and the supporting base 10. The plate 30 and the panel 36 and the levers 31, 32 may thus be formed into a parallelepiped structure or configuration.

Figure 2:
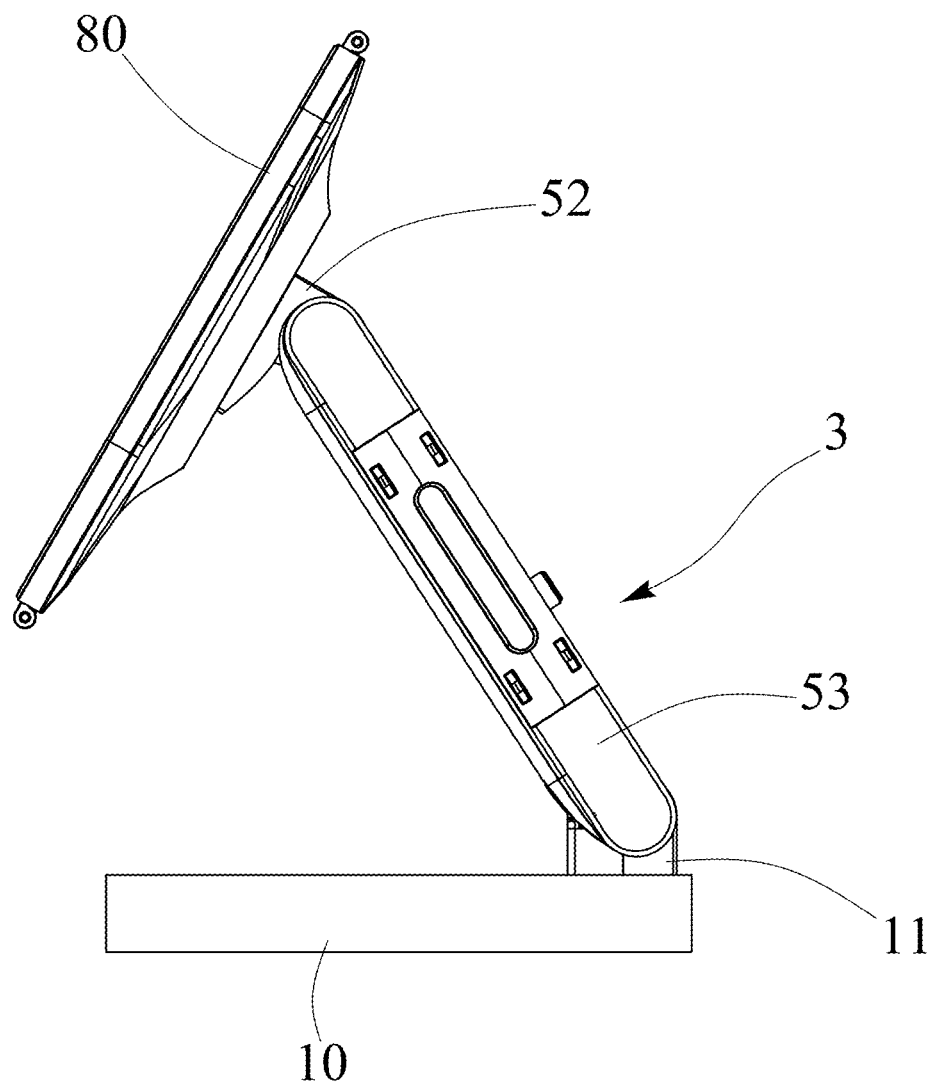
FIG. 2 is a side plan schematic view of the pivotal supporting device.
Figure 3:
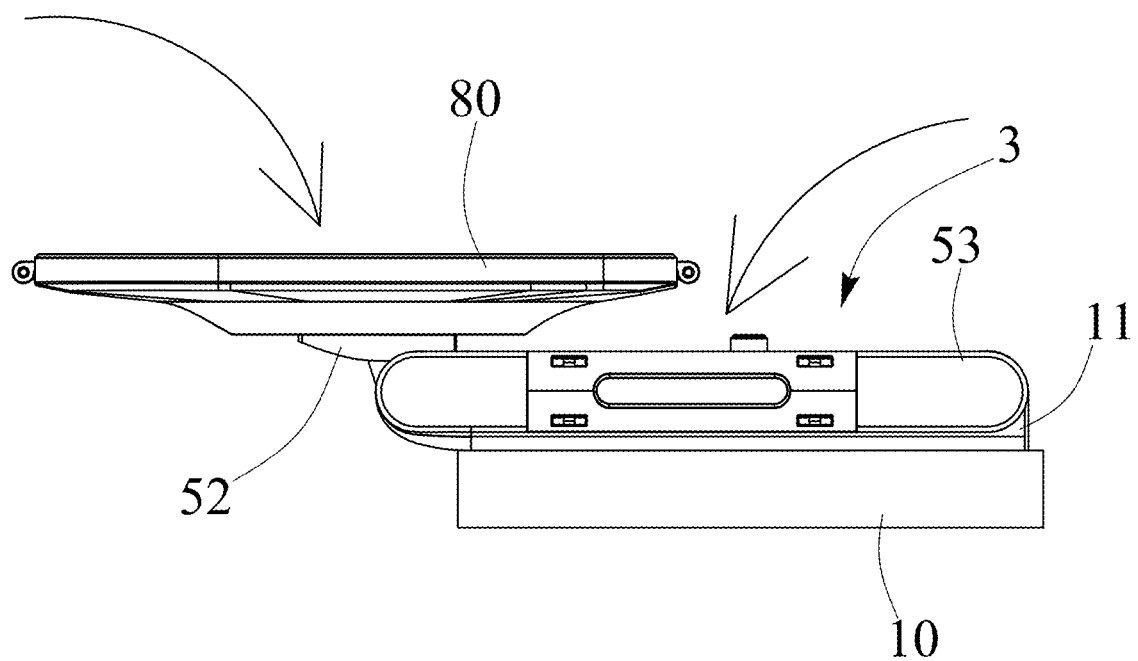
FIG. 3 is another side plan schematic view similar to FIG. 2, illustrating the operation of the pivotal supporting device.
Figure 4:
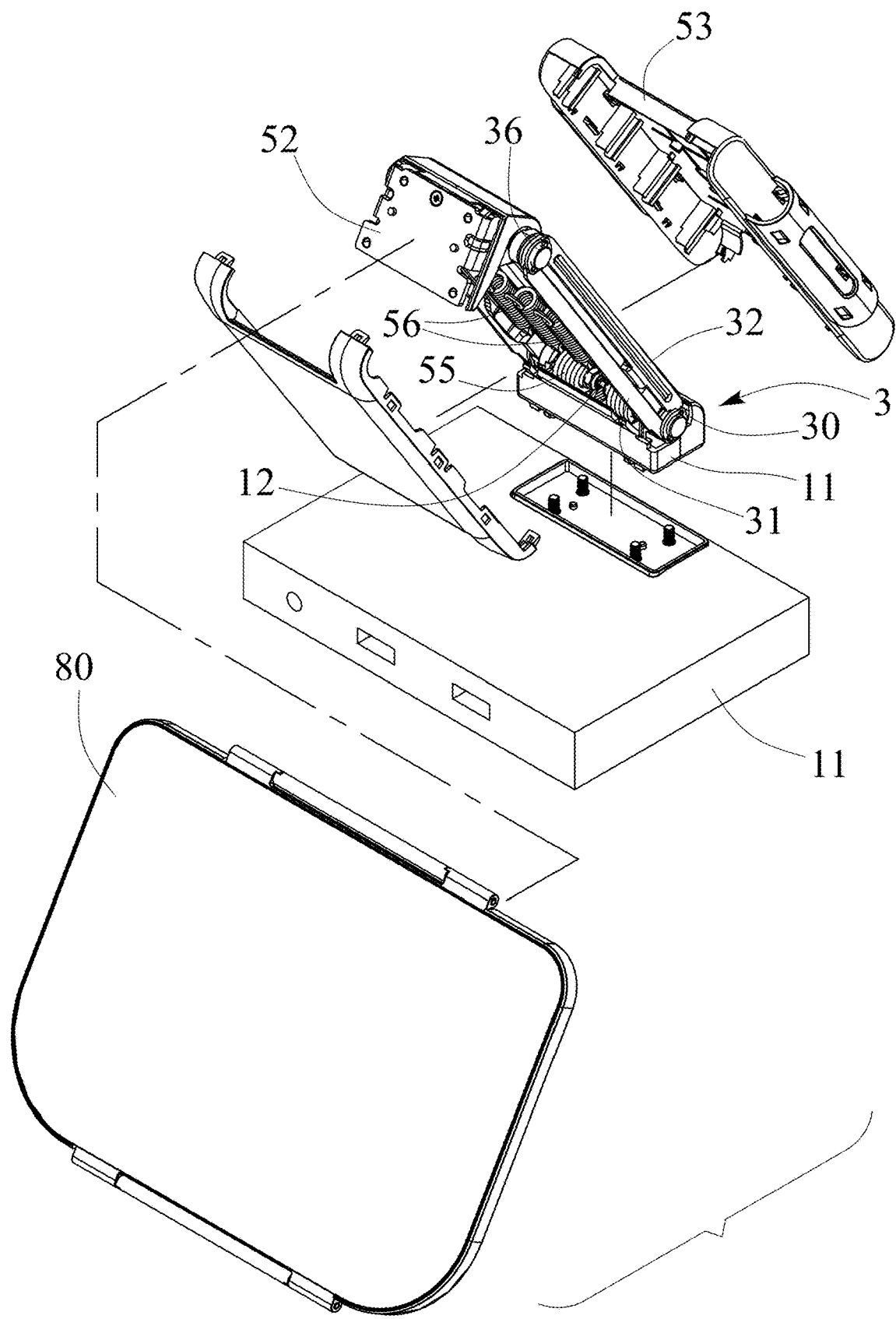
FIG. 4 is a partial exploded view of the pivotal supporting device.
Figure 5:
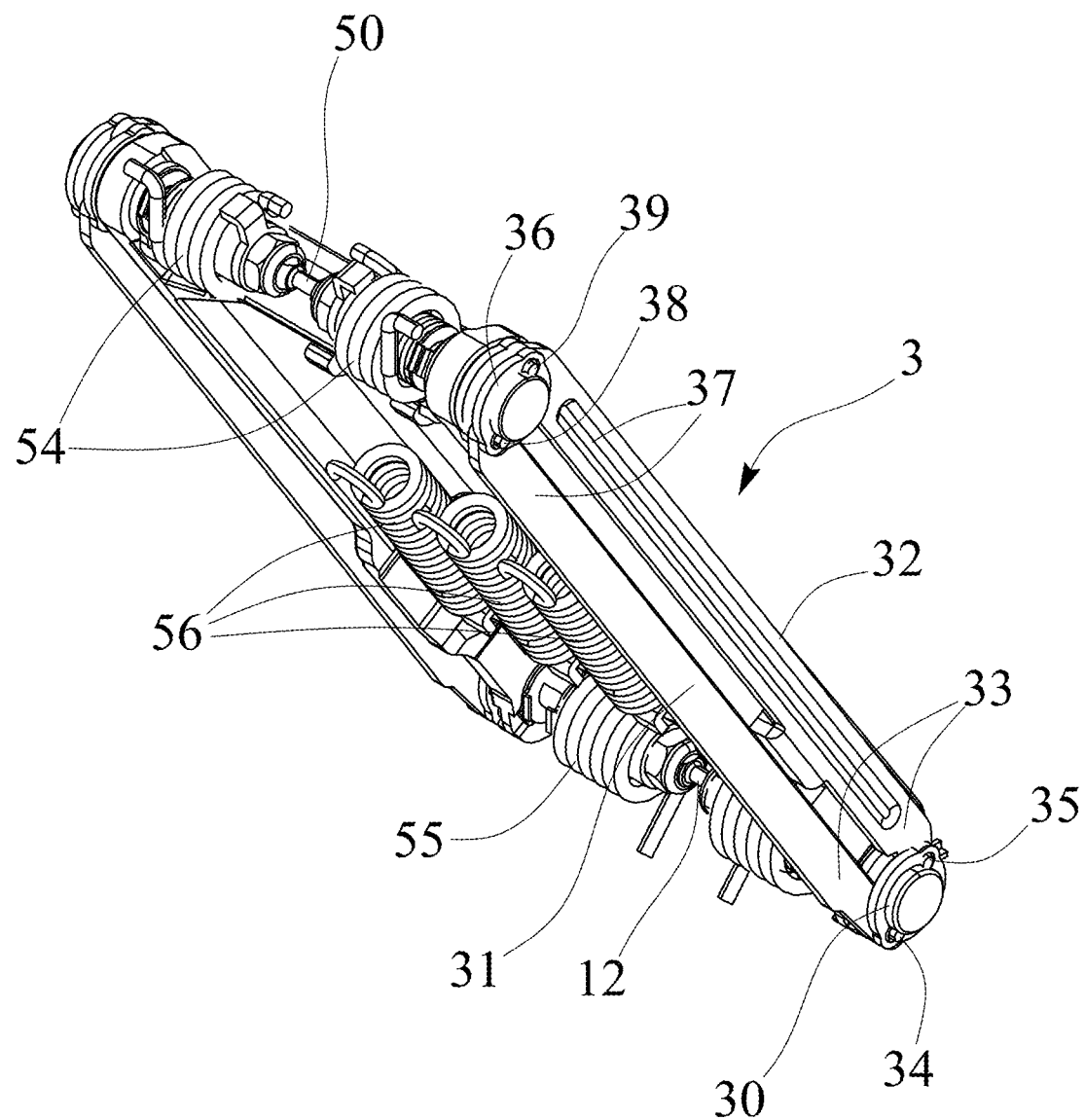
FIG. 5 is a partial perspective view illustrating a pivotal supporting lever or arm of the pivotal supporting device.

The supporting arm 3 further includes a spindle 50 attached or mounted or secured to the panel(s) 36 and engaged with the with panel(s) 36 a non-circular cross section segment 51, or the spindle 50 includes a non-circular cross section segment 51 engaged with the panel(s) 36 for preventing the panel(s) 36 from being pivoted or rotated relative to the spindle 50. A supporting member or carrier 52 is attached or mounted or secured to the spindle 50 for attaching or mounting or supporting a remote member 80, such as a monitor, portable phone, television, keyboard, displayer 80, or the like. It is preferable, but not necessary that the carrier 52 is attached or mounted or secured to the spindle 50 and pivoted or rotated in concert with the spindle 50 and the panel(s) 36 relative to the levers 31, 32 (FIGS. 2, 3). The supporting arm 3 may further include an outer hood or cover or housing 53 attached or mounted or engaged or secured onto the levers 31, 32 and the plates 30 and the panels 36 and the pivot shaft 12 and the spindle 50 and the like for covering or shielding and protecting the parts or elements therein.

The supporting arm 3 may further include one or more spring biasing members 54 attached or mounted or engaged onto the spindle 50 and engaged between or with the spindle 50 and/or the carrier 52 and the levers 31, 32 and/or the housing 53 of the supporting arm 3 for resiliently supporting the carrier 52 and the remote member 80 in place. One or more spring biasing elements 55 may further be provided and attached or mounted or engaged onto the pivot shaft 12 and engaged between or with the pivot shaft 12 and the levers 31, 32 and/or the housing 53 of the supporting arm 3 for resiliently supporting the supporting arm 3 in place. One or more spring biasing components 56 may further be provided and attached or mounted or engaged onto and engaged between the pivot shaft 12 and the spindle 50 for further resiliently supporting the carrier 52 and the remote member 80 in place.

In operation, as shown in FIGS. 2 and 3, the supporting arm 3 may be easily and quickly and readily pivoted or rotated relative to the supporting seat 11 and the supporting base 10, and the carrier 52 and the remote member 80 may be easily and quickly and readily pivoted or rotated relative to the housing 53 with the panels 36 and the spindle 50, and the spring biasing members 54 and the spring biasing elements 55 and the spring biasing components 56 may be provided for resiliently supporting the carrier 52 and the remote member 80 in place.

Accordingly, the pivotal supporting device in accordance with the present invention includes a supporting arm or arm for solidly and stably supporting a remote or mobile facility or member in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pivotal support device for supporting an electronic device, comprising:
    a supporting base,
    a supporting arm including:
    a plate,
    a pivot shaft attached to said plate,
    two levers having first end portions pivotally attached to said plate with pivot pins, said levers each including a second end portion,
    a panel pivotally attached to said second end portions of said levers with pivot axles for forming a parallelepiped structure with said levers and said plate,
    a spindle attached to said panel,
    at least one spring biasing component disposed between said pivot shaft and said spindle,
    a carrier attached to said spindle, and
    a remote member attached to said carrier, wherein said supporting arm includes at least one spring biasing element engaged onto said pivot shaft and engaged with said supporting arm, and at least one spring biasing member engaged onto said spindle and engaged with said supporting arm.

2. The pivotal supporting device as claimed in claim 1, wherein said pivot shaft includes a non-circular cross section segment engaged with said plate for preventing said plates from being rotated relative to said pivot shaft.

3. The pivotal supporting device as claimed in claim 1, wherein said spindle includes a non-circular cross section segment engaged with said panel for preventing said panel from being rotated relative to said spindle.

4. The pivotal supporting device as claimed in claim 1, wherein said supporting arm includes a housing engaged onto said levers and said plate and said panel and said pivot shaft and said spindle.

\* \* \* \* \*